Aug. 20, 1968      F. W. IRLAND      3,397,975

APPARATUS FOR PRODUCING SHEET GLASS

Filed Oct. 17, 1963

INVENTOR.
Frank W. Irland
BY
Nobbe & Swope
ATTORNEYS

United States Patent Office 3,397,975
Patented Aug. 20, 1968

3,397,975
APPARATUS FOR PRODUCING SHEET GLASS
Frank W. Irland, Shreveport, La., assignor to Libbey-Owens-Ford Glass Company, Toledo, Ohio, a corporation of Ohio
Filed Oct. 17, 1963, Ser. No. 316,970
3 Claims. (Cl. 65—182)

ABSTRACT OF THE DISCLOSURE

A tank-furnace for the continuous production of window glass wherein the floor of the working receptacle from which the sheet is drawn upwardly is at a higher elevation than the floor of the adjacent cooling chamber through which molten glass flows into the working receptacle, and a body of molten metal is maintained beneath the molten glass in the cooling chamber and working receptacle.

---

The present invention relates broadly to the production of sheet or window glass, and more particularly it relates to improvements in the cooling chamber and draw pot for producing such glass.

It is a primary object of the invention to improve the condition of molten glass for drawing into sheet form whereby distortion in the subsequently drawn sheet will be minimized.

Another object of the invention is to reduce temperature differentials in a stream of molten glass flowing into a zone of sheet formation.

Another object is to minimize convection currents within the molten glass stream flowing into the zone of sheet formation.

Still another object of the invention is to reduce friction between the molten glass and the surface upon which it is supported so that the molten glass advances into the drawing zone in a smooth flow free from turbulence.

Other objects and advantages of the invention will become more apparent during the course of the following description when taken in connection with the accompanying drawings:

In the drawings, wherein like numerals are employed to designate like parts throughout the same:

The term "sheet" or "window" glass is used in the glass-making art to designate flat, continuously drawn glass having fire polished surfaces attained during formation of the sheet. Such glass is drawn directly into final usable form as opposed to plate glass, which is rolled into ribbon form and the surfaces of which must then be mechanically ground and polished to impart transparency thereto. In the production of sheet glass, raw materials (i.e. glass batch) are charged into one end of a tank furnace and are melted and integrated into the mass of molten glass contained therein. The molten glass flows successively through refining and cooling sections where it is properly conditioned and cooled to working temperature, and then into a draw pot or working receptacle from which the sheet is drawn.

Since the glass ribbon is drawn from the molten glass in the draw pot directly into final sheet form, the molten glass must arrive in the draw pot in a smooth even flow and must be uniform in temperature from side to side of the draw pot in order to produce a sheet of uniform thickness free from distortion. For many years, efforts have been made to reduce the distortion commonly found in such glass by improving conditions both within the molten glass and in the atmosphere over the molten glass and surrounding the newly formed sheet, with the result that there has been a steady improvement in its quality. However, a certain amount of distortion is not uncommon even today in such glass due to undesirable flow conditions and temperature fluctuations in the molten glass arriving in the zone of sheet formation, and it is to these conditions which the present invention is directed. According to the invention, a layer of molten metal is maintained beneath the molten glass in the latter stages of the furnace to assist in equalizing the temperature in the molten glass as well as to facilitate its flow.

Figure 1:
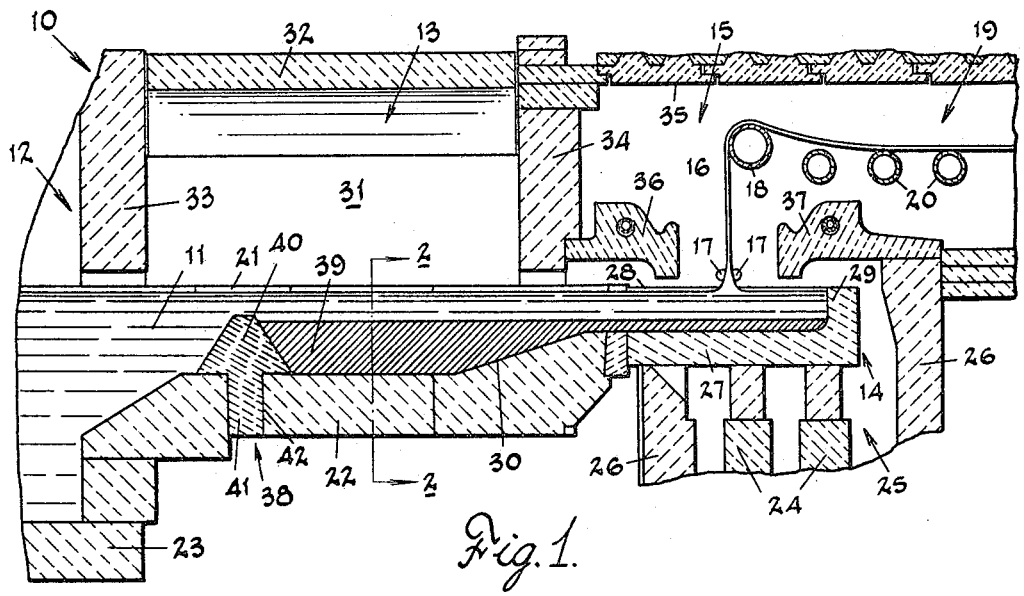
FIG. 1 is a fragmentary longitudinal vertical section through the cooling and drawing chambers of a sheet glass furnace embodying the invention.

With reference now to the drawings and particularly to FIG. 1, there is designated generally at 10 the outlet or drawing end of a continuous tank furnace wherein raw glass making materials are melted and refined to form a molten mass 11. Details of the melting and refining areas of the furnace do not constitute part of the present invention and have not been shown in the drawings. After leaving the refining chamber, the exit end of which is indicated at 12, the molten glass flows through a cooling chamber 13 where its temperature is brought down to the proper working level and then, according to the so-called Colburn process with which the present invention is particularly concerned although in no way limited thereto, into a relatively shallow draw pot or working receptacle 14 where it is continuously drawn upwardly through a drawing chamber 15 into a sheet or ribbon 16. Pairs of conventional knurled rolls 17 engage the sheet at either edge to maintain a predetermined width and counteract its natural tendency to narrow to a thread. After the newly formed sheet has travelled for a short distance vertically and when substantially set in its final form although still in a semiplastic condition, it is deflected about a bending roll 18 into a substantially horizontal plane for movement through an annealing lehr, the initial portion of which is shown at 19, on a series of horizontally aligned rolls 20.

Although the depth of the molten glass may be five feet or more in the melting chamber (not shown) and refining chamber 12 of the furnace, this depth is considerably reduced in the latter stages of the furnace and particularly in the draw pot 14 where the actual sheet formation takes place. Thus, the cooling chamber 13 includes side walls 21 and a floor 22 positioned some distance above the floor 23 of the refining chamber 12 to form the channel through which molten glass flows into the draw pot 14. The draw pot is supported upon pot stools 24 within a pot chamber 25 to which heat is supplied as by gas burners or resistance heating elements (not shown) extending through the walls 26 thereof, and includes a floor 27, opposite side walls 28 and a rear wall 29. The floor 22 of the cooling chamber slopes upwardly at 30 to the level of the draw pot floor 27.

The atmosphere over the molten glass in the melting, refining and cooling chambers is conventionally enclosed by side walls 31 (FIG. 2) and a roof or arch 32. A wall 33 across the end of the refining chamber 12 isolates the hot gases over the molten glass therein from the turbulent atmosphere over the molten glass in the cooling chamber and also prevents the carrying over of unmelted batch particles and particles of dirt from gas fired burners (not shown) into the cooling chamber. The atmosphere over the molten glass in the cooling chamber is in turn separated from the drawing chamber 15 by a wall 34 which comprises one wall of the drawing chamber. The drawing chamber further includes side enclosures (not shown) and a refractory cover 35 which is an extension of the roof of the lehr 19. In order to create a quiescent atmosphere of stable temperature though which the sheet 16 can be drawn, front and rear lip-tiles 36 and 37, respectively, are located above the draw pot adjacent either surface of the sheet. These lip-tiles serve to shield the atmosphere of the drawing chamber through which the sheet passes from the relatively higher temperatures immediately above the molten glass in the draw pot. The front lip-tile 36, due to its association with the wall 34, also aids in isolating the drawing chamber from the atmosphere over the molten glass in the cooling chamber while the rear lip-tile serves to restrict hot gases from the pot chamber to the area immediately adjacent the rear pot wall 29 and prevent them from rising to contact the underside of the sheet as it enters the lehr 19.

Since the sheet 16 is drawn directly into its final form from the molten glass in the draw pot, its quality is to a large extent determined by the condition of the molten glass at that point. The thickness of the sheet will be influenced by the viscosity of the molten glass, which in turn is a function of its temperature. Thus, it will be apparent that a lack of temperature uniformity in the molten glass will cause undesirable thickness variations in the sheet. Likewise, any disturbance in the flow of the molten glass stream in the area where the sheet is formed will result in distortion in the sheet. Much effort has been expended in attempts to improve temperature and flow conditions of the molten glass in the final stages of the furnace. For this purpose the depth of the glass stream is reduced in the cooling chamber and draw pot in order to reduce the total mass of molten glass in that area and permit more accurate control over its temperature. As the depth decreases however, the temperature tends to fluctuate more readily in response to external influences and the flow at the surface of the stream is affected to a greater extent by contact with the floor of the furnace. The floor 22 in the cooling chamber, due to its size, is comprised of a plurality of individual refractory blocks. Although the joints between adjacent blocks are sealed, it is not possible to achieve complete uniformity of heat loss through the floor. The glass stream also tends to cool most rapidly along the edges where it contacts the side walls of the cooling chamber. As the depth of the stream is reduced, these factors increasingly affect temperature uniformity.

Although the draw pot 14 is generally cast as a monolithic unit, it has been found that areas of relatively low temperature develop in the floor 27 over the pot stools 24 upon which it is supported. This is due to the fact that the hot gases introduced into the pot chamber 25 to heat the draw pot and maintain the molten glass therein at the proper drawing temperature are isolated from those areas.

It has been discovered that these temperature variations can be substantially reduced if not entirely eliminated, and flow conditions for the molten glass stream materially improved, by maintaining a layer of nonreactive molten metal beneath the molten glass in the latter stages of the furnace. Thus, according to the invention a dam 38 extends across the cooling chamber to maintain a body of molten metal 39 within the cooling chamber 13 and draw pot 14. The dam is of a conventional refractory material not affected by either the molten glass or the molten metal and includes an upper retaining wall section 40 held in place by a key 41 received within an opening 42 in the cooling chamber floor 22. As shown in FIG. 1, the molten metal preferably extends into the draw pot so as to obtain the maximum benefit thereof as will be hereinafter explained. Any suitable metal or alloy may be employed to form the molten body 39, it being necessary, of course, that the molten material be nonreactive and immiscible with the molten glass and have a melting point below and a boiling point above the temperature of the molten glass in that section of the furnace. In addition, its specific gravity must be substantially greater than that of the glass in order to maintain the molten body in position behind the dam 38. For example tin, which has a melting point of 449.4° F., a boiling point of 4120° F. and a density of 455 pounds per cubic foot has been found to form a very satisfactory molten body 39 beneath the molten glass in the aforedescribed sheet drawing operation. Many of the alloys of tin may likewise be employed.

Due to its ability to conduct heat rapidly, the molten body 39 acts as a heat sink and tends to equalize temperature differentials within the molten glass supported thereabove. Differences in temperature at various points on the refractory floor covered by the molten metal are likewise equalized so that a substantially uniform temperature exists at the interface of the molten metal and glass. Consequently, localized convection currents within the molten glass, that is, movement of glass from the warmer toward the colder areas, are eliminated and quiescent conditions are established within the glass in the very critical zone of sheet formation.

The body of molten metal constitutes a further improvement in that it provides a lubricating effect at the interface between the metal and glass so that additional molten glass freely flows into the zone of sheet formation to replace that used in forming the sheet. By thus reducing the retarding effect of friction, turbulence within the molten glass due to this effect is minimized and distortion in the sheet is thereby reduced. As a result of the lubricating and temperature equalizing effects of the molten metal, it is possible to further reduce the depth of molten glass 11 within the cooling chamber and draw pot so that temperature controlling means conventionally located above the molten glass can more accurately maintain the glass at the proper drawing temperature than has heretofore been possible.

The body of molten metal 39 also protects the refractory floors 22 and 27 of the cooling chamber and draw pot against corrosion by the hot glass. Particles eroded from the refractory blocks normally enter the molten glass and cause defects in the sheet commonly known as "stones." The molten metal body 39 not only reduces the incidence of this defect in the sheet but also extends the life of the cooling chamber and draw pot by reducing corrosion thereof.

Figure 2:
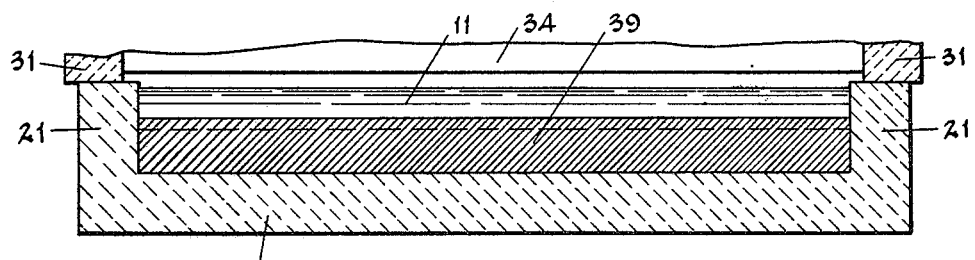
FIG. 2 is a transverse vertical sectional view taken along line 2—2 of FIG. 1.
Figure 3:
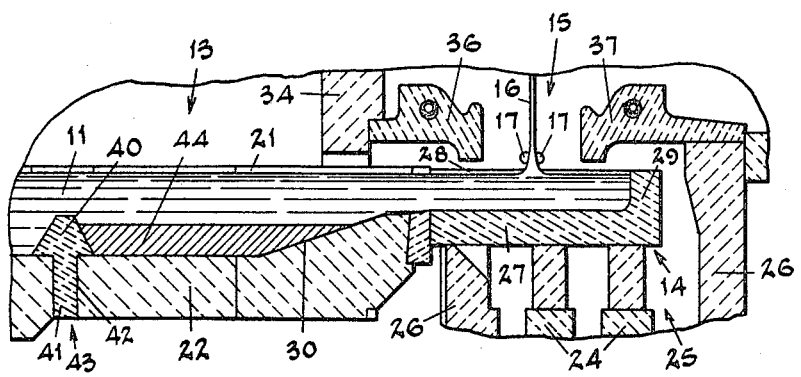
FIG. 3 is a fragmentary longitudinal vertical section through a cooling and drawing chamber embodying a modified form of the invention.

There is shown in FIG. 3 an alternate embodiment of the invention which is identical to the embodiment of FIGS. 1 and 2 except that the dam 43 does not project as far above the floor of the cooling chamber as does the dam 38 of the previously described embodiment, and the body of molten metal 44 is contained entirely within the cooling chamber by the sloping portion 30 of the floor 22. This embodiment may be employed where it is desired to maintain a greater depth of molten glass in the draw pot as for example, where an extra heavy sheet is being drawn.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:

1. A continuous window glass furnace including a cooling chamber and a working receptacle arranged in end to end communicating relationship, means for supplying refined molten glass to the cooling chamber, said cooling chamber and working receptacle including a floor and opposite side walls defining a channel along which the molten glass flows, the floor of the working receptacle being at a higher elevation than the floor of the cooling chamber, a portion of the cooling chamber floor sloping upwardly to the level of the working receptacle floor, a dam extending transversely across the floor of the cooling chamber between the opposite side walls thereof, a body of molten metal in said cooling chamber and working receptacle upon which the molten glass floats in flowing from the cooling chamber into the working receptacle, said dam retaining the body of molten metal on the working receptacle side thereof in the channel, a pot chamber beneath the working receptacle to which heat is supplied for controlling the temperature of the molten glass in said working receptacle, and means for drawing a ribbon of glass upwardly from the molten glass in the working receptacle.

2. A continuous window glass furnace as claimed in claim 1, wherein said molten metal is nonreactive and immiscible with the molten glass, has a specific gravity substantially greater than the molten glass, and a melting point below and a boiling point above the temperature of the molten glass in said cooling chamber and working receptacle.

3. A continuous window glass furnace as claimed in claim 1, wherein said molten metal is selected from the group consisting of tin and its alloys.

References Cited
UNITED STATES PATENTS

| | | | |
|---|---|---|---|
| 1,598,764 | 9/1926 | Fox et al. | |
| 3,127,261 | 3/1964 | Long | 65—182 XR |
| 3,218,141 | 11/1965 | Lambert | 65—182 XR |
| 3,231,351 | 1/1966 | Birchard. | |
| 1,695,528 | 12/1928 | Brownlee | 65—203 XR |
| 1,834,656 | 12/1931 | Spinasse | 65—203 XR |

DONALL H. SYLVESTER, *Primary Examiner.*

F. W. MIGA, *Assistant Examiner.*